(12) United States Patent
Jønsson et al.

(10) Patent No.: US 6,967,037 B1
(45) Date of Patent: Nov. 22, 2005

(54) FOOD COMPOSITIONS WITH HIGH SOLIDS CONTENT, A METHOD FOR ITS PREPARATION AS WELL AS THE USE OF CARRAGEENANS FOR GELLING A FOOD COMPOSITION

(75) Inventors: Torben Jønsson, Charlottenlund (DK); Jeanette Kristensen, Roskilde (DK); Jan Grøndal, Jyllinge (DK)

(73) Assignee: CP Kelco ApS, Lille Skensved (DK)

( * ) Notice: Subject to any disclaimer, the term of this patent is extended or adjusted under 35 U.S.C. 154(b) by 0 days.

(21) Appl. No.: 09/926,475

(22) PCT Filed: May 12, 2000

(86) PCT No.: PCT/DK00/00252

§ 371 (c)(1),
(2), (4) Date: Jan. 17, 2002

(87) PCT Pub. No.: WO00/69275

PCT Pub. Date: Nov. 23, 2000

(30) Foreign Application Priority Data

May 12, 1999 (DK) ............................. 1999 00650

(51) Int. Cl.$^7$ ........................... A23L 1/236; A23L 1/05
(52) U.S. Cl. ..................... 426/548; 426/575; 426/658
(58) Field of Search ............................. 426/548, 575, 426/573, 658

(56) References Cited

U.S. PATENT DOCUMENTS

| | | |
|---|---|---|
| 4,390,553 A | 6/1983 | Rubenstein et al. |
| 4,714,620 A | 12/1987 | Bunick et al. |
| 4,959,230 A | 9/1990 | Wyss et al. |
| 5,000,974 A | 3/1991 | Albersmann |
| 5,132,128 A | 7/1992 | Rockland |
| 5,306,519 A | 4/1994 | Peterson et al. |
| 5,603,979 A | 2/1997 | Lasdon et al. |
| 5,607,716 A | 3/1997 | Doherty et al. |
| 5,631,034 A | 5/1997 | Trumbetas et al. |
| 6,531,174 B2 * | 3/2003 | Barrett et al. ............... 426/573 |

FOREIGN PATENT DOCUMENTS

| | | |
|---|---|---|
| EP | 0045522 | 2/1982 |
| EP | 0273001 | 6/1988 |
| EP | 0366248 | 5/1990 |
| WO | 95/12985 | 5/1995 |
| WO | 98/20860 | 5/1998 |

OTHER PUBLICATIONS

Nijenhuis, K., "12 Carrageenans", in Advanced Polymer Science, 130, 203-18, (1997).
Stortz, C.A. and Cerezo, A.S., Carbohydrate Research, 145 (1986) 219-235.
W.R. Thomas "3 Carrageenan" in Thickening and Gelling Agents for Food, 2nd edition, A. Imeson, 1997.

* cited by examiner

Primary Examiner—Leslie Wong
(74) Attorney, Agent, or Firm—Greenblum & Bernstein, P.L.C.

(57) ABSTRACT

Food composition comprising soluble solids in the range of about 50% to about 90% by weight, at least 70% by weight thereof being a sweetening system comprising sucrose and non-sucrose sweeteners in a weight ratio of sucrose to non-sucrose sweeteners of 0:100 to 95:5, wherein the non-sucrose sweetener is of a DE (Dextrose Equivalent) of at least about 30, a carrageenan component in an amount sufficient to form a gel, and water to balance, and wherein the gelation temperature of the composition is <95° C. The food composition may be produced by a process comprising (a) dispersing carrageenan in a syrup of a non-sucrose sweetener at a temperature sufficient to disperse the carrageenan in the syrup while stirring, (b) adding water and heating the mixture to the boiling point thereof, (c) adjusting the soluble solids content to from about 50% to about 90% by weight, (d) depositing the mixture and (e) cooling the mixture to below the depositing temperature of the mixture. The food composition gels rapidly and forms a gel at temperatures of below 95° C. The food composition is especially confectionery products such as soft candies, marshmallows or glazings.

39 Claims, 10 Drawing Sheets

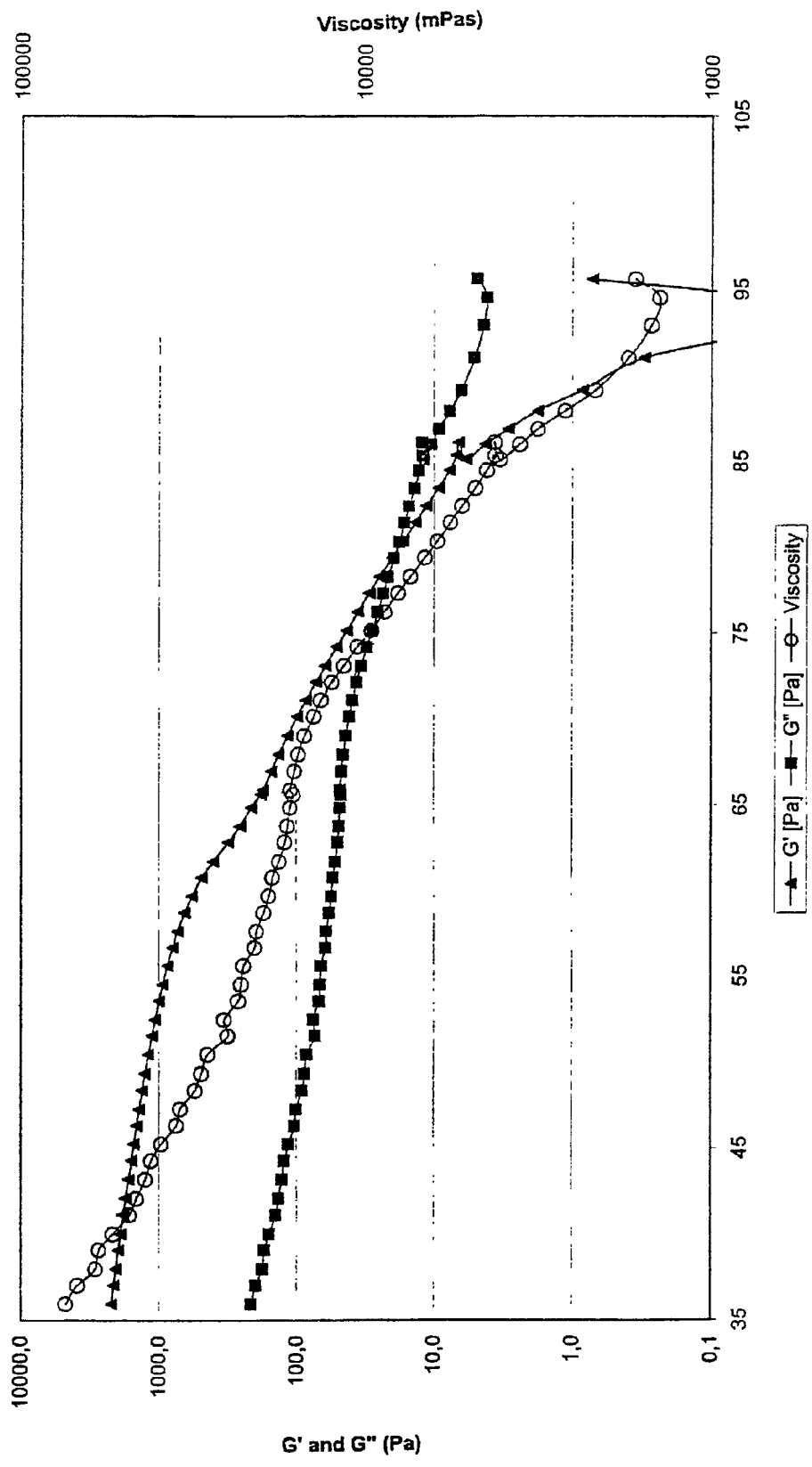
Fig 1.1

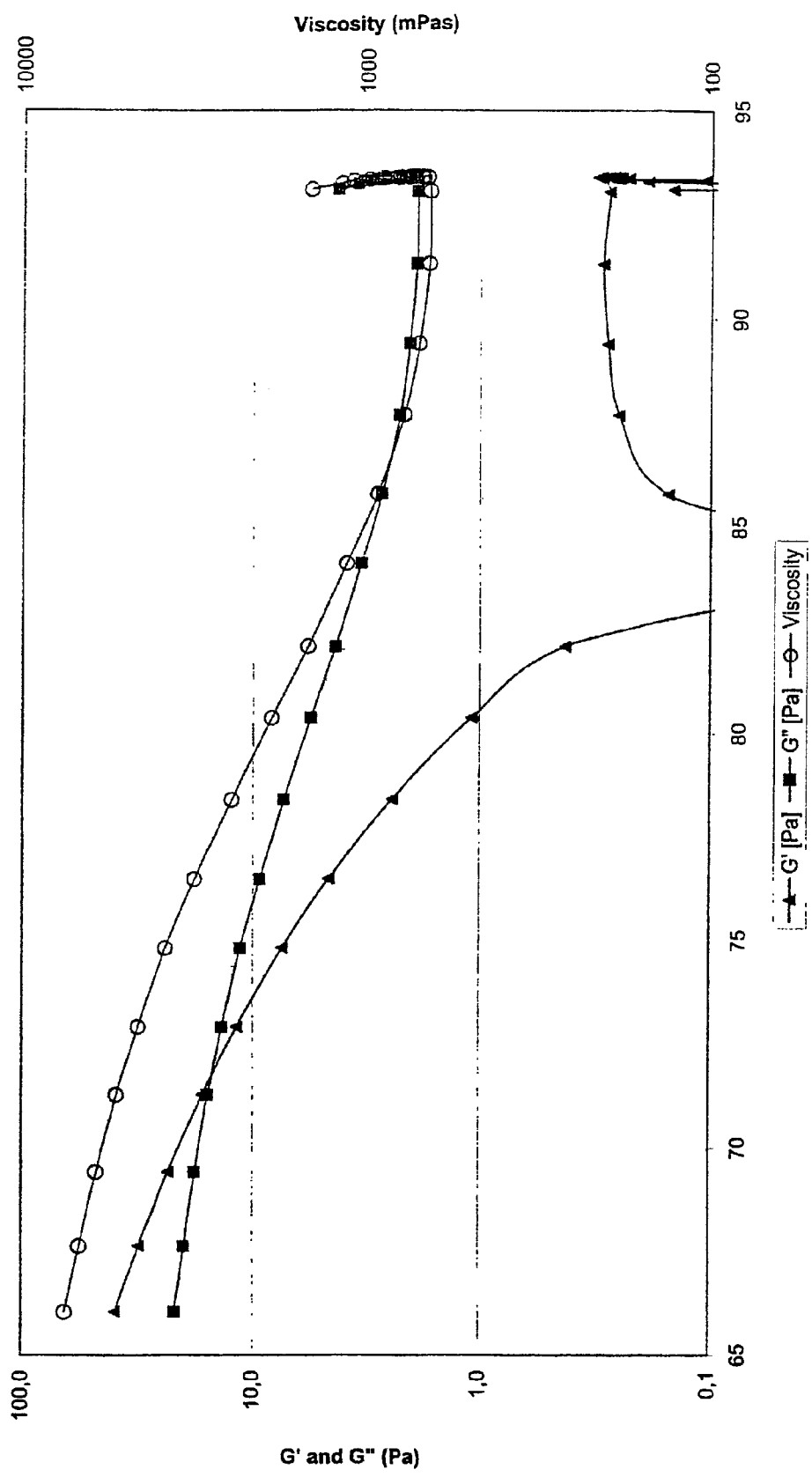
Fig 1.2

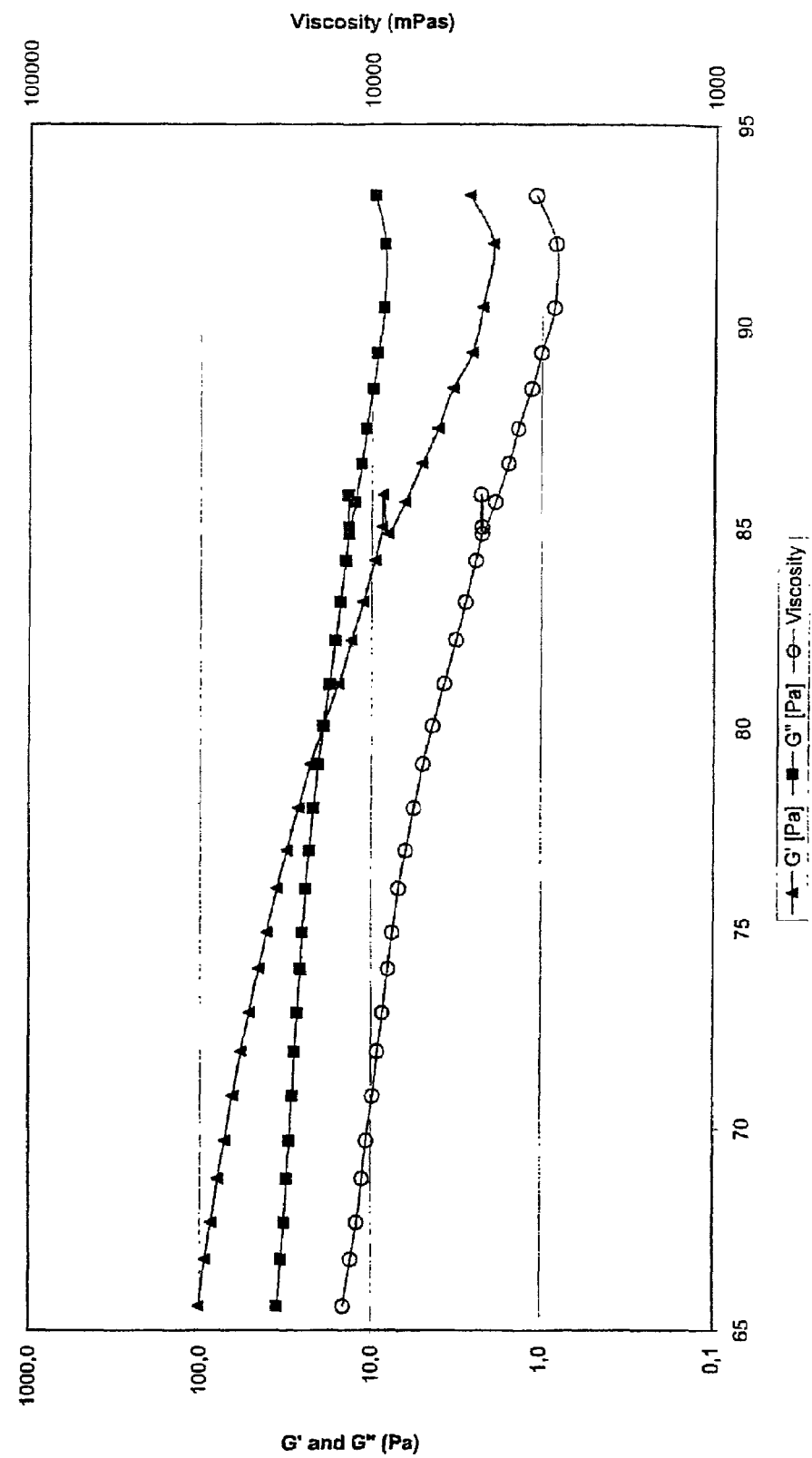
Fig 1.3

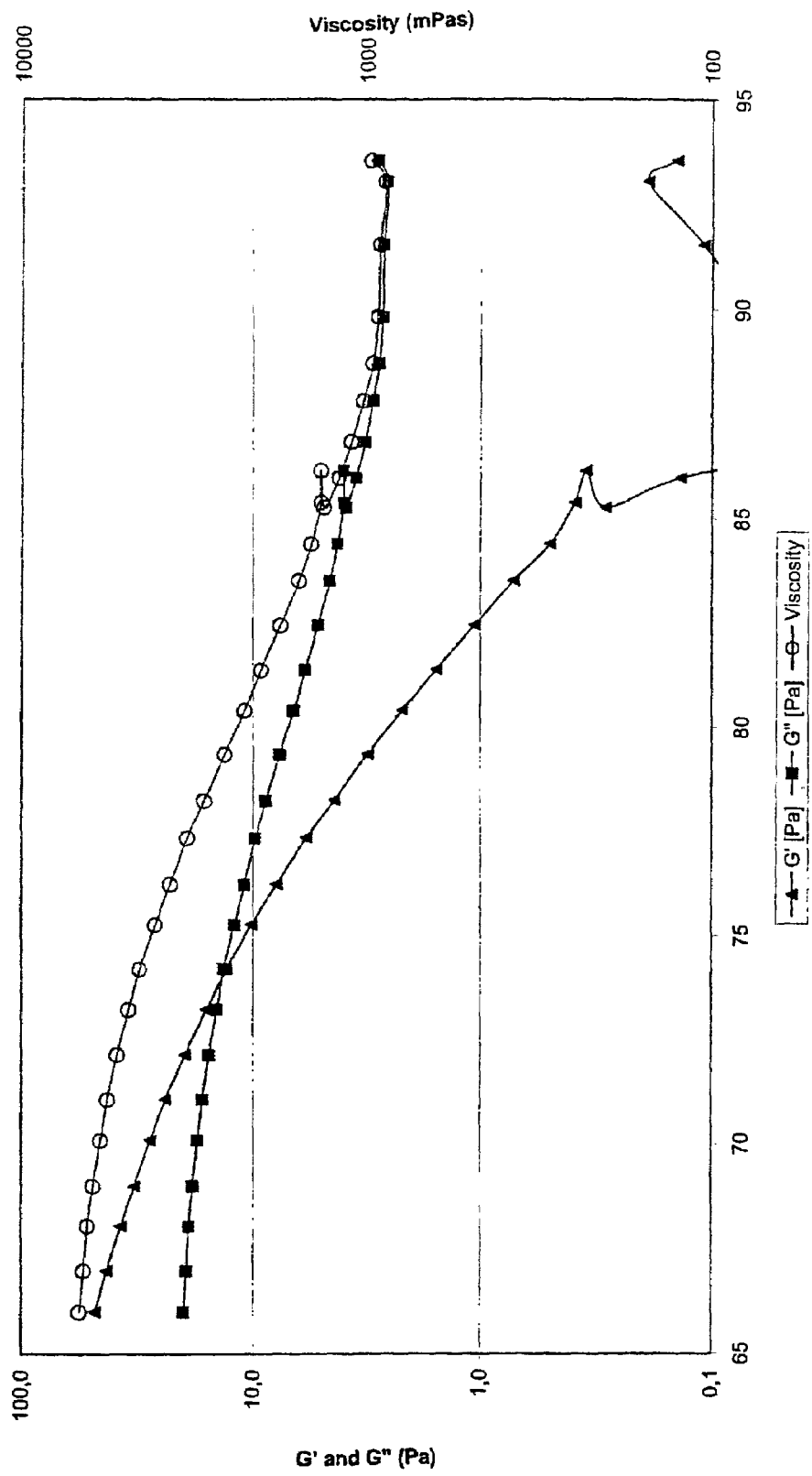
Fig 1.4

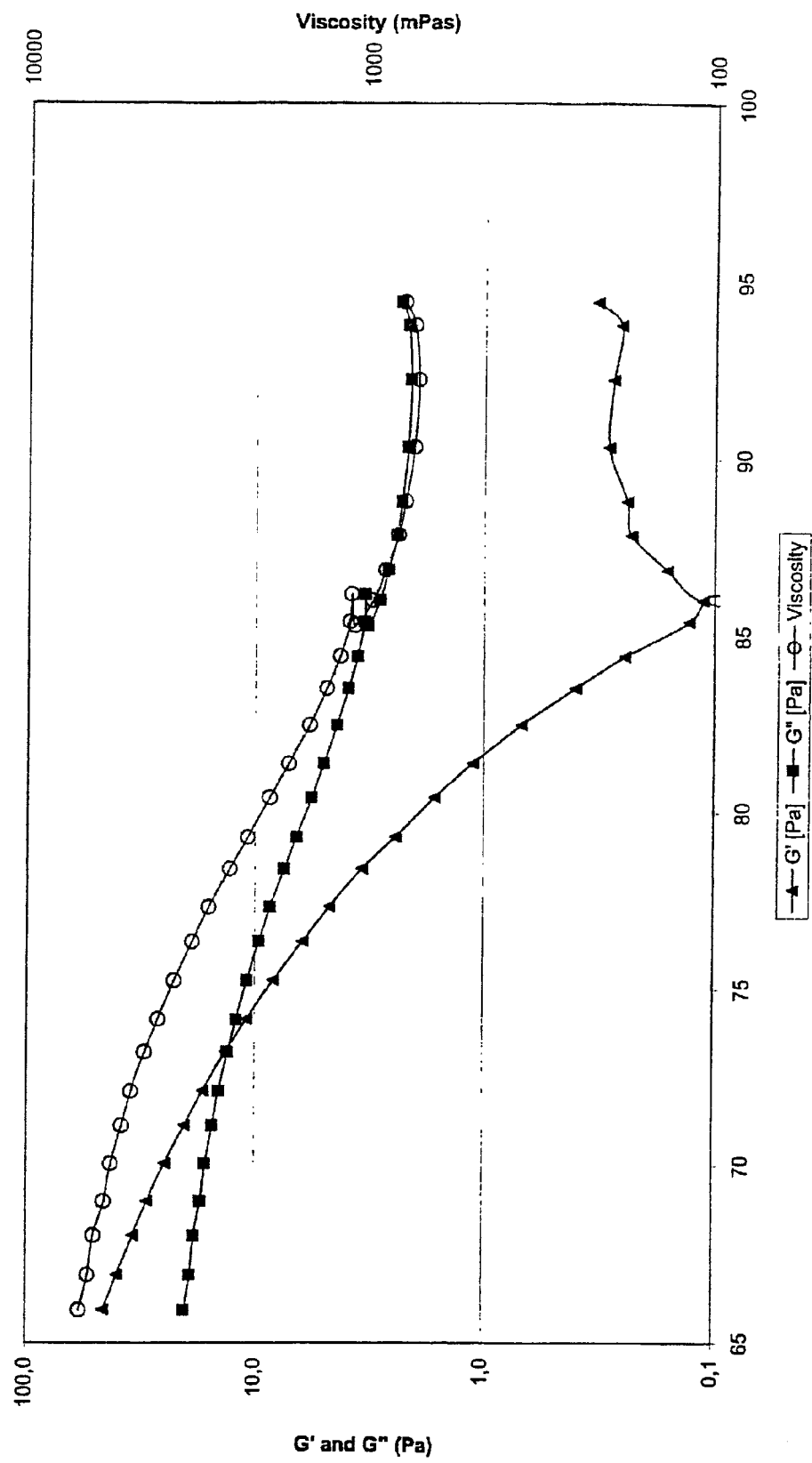
Fig 1.5

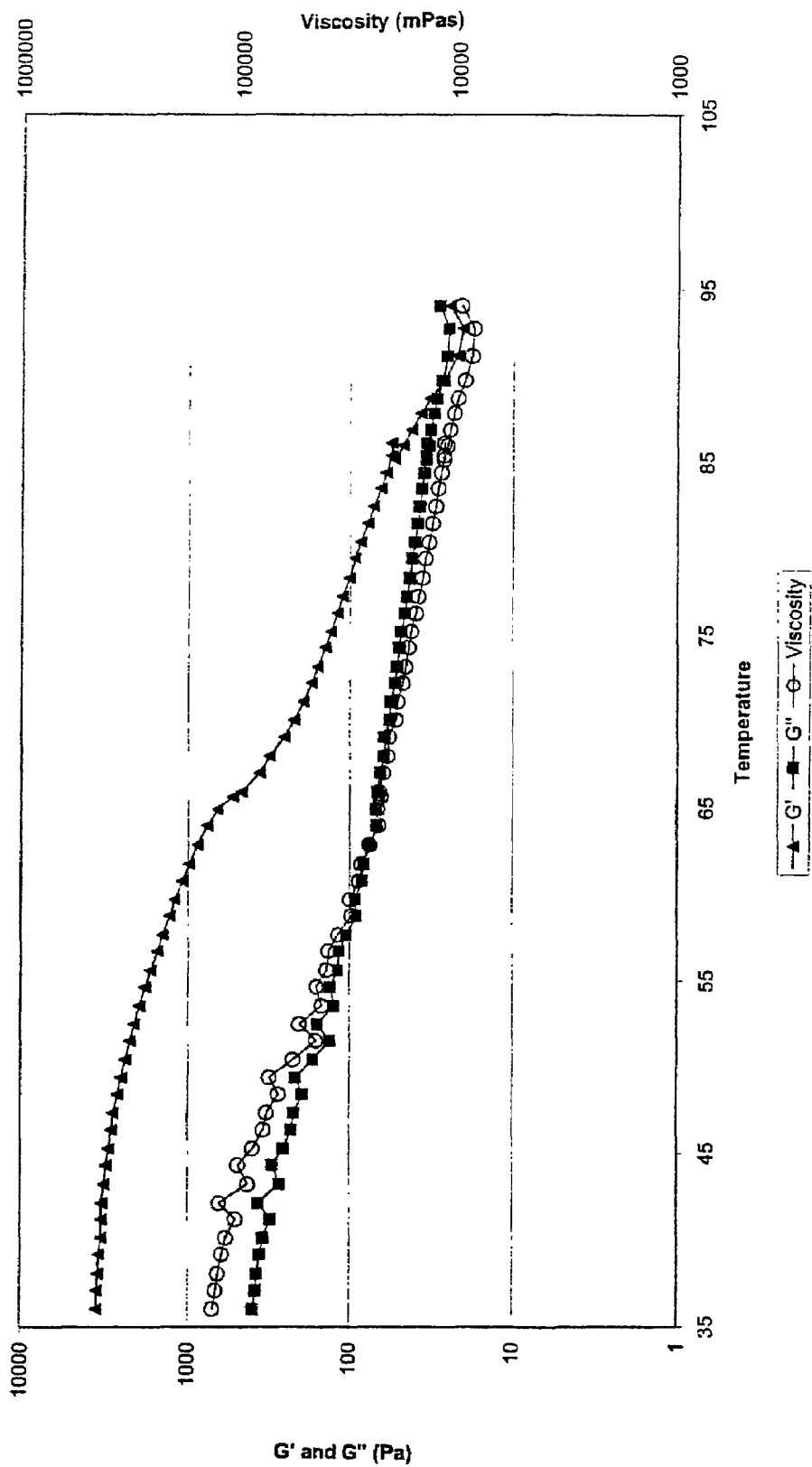
Fig 1.6

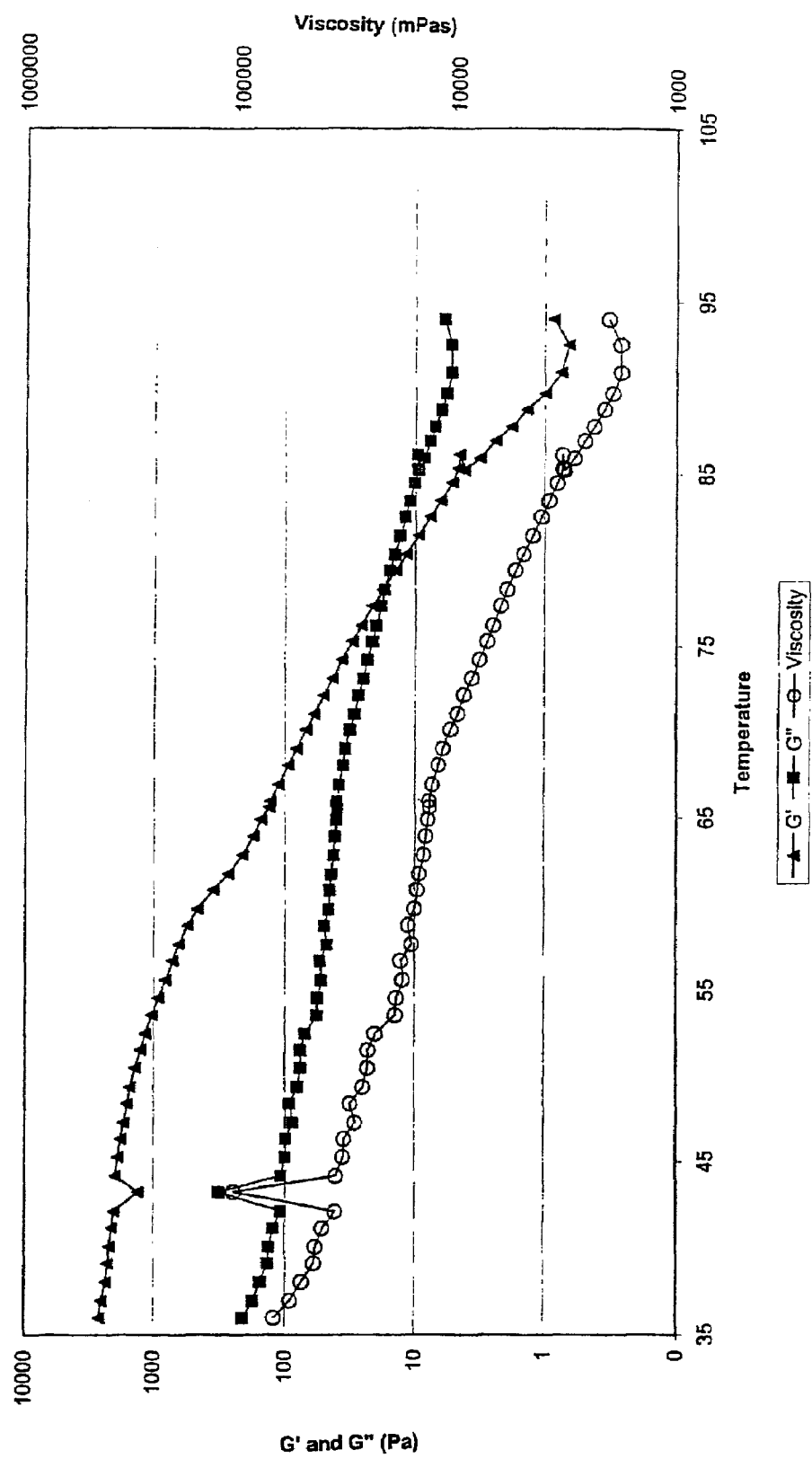
Fig 1.7

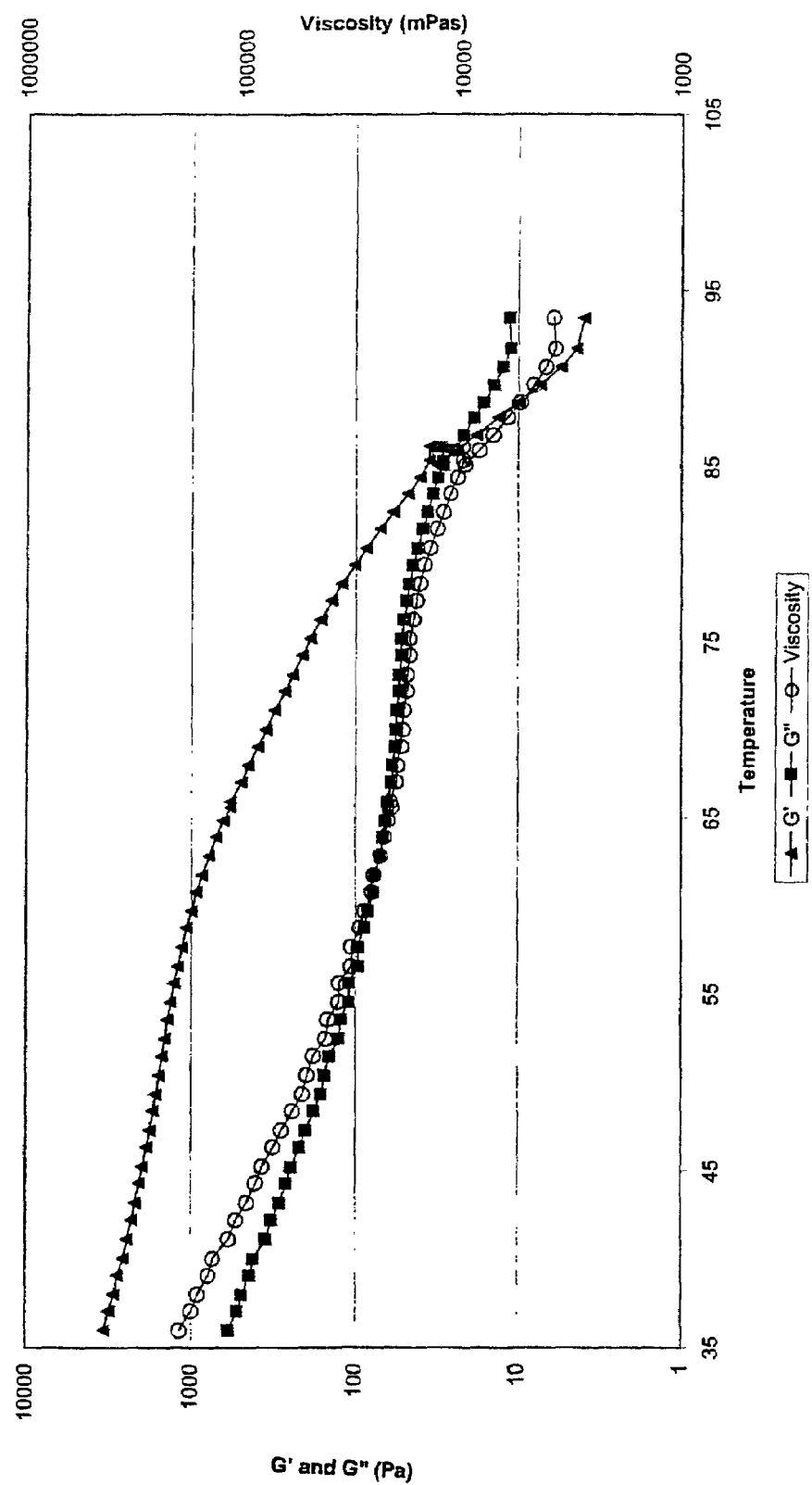
Fig 1.8

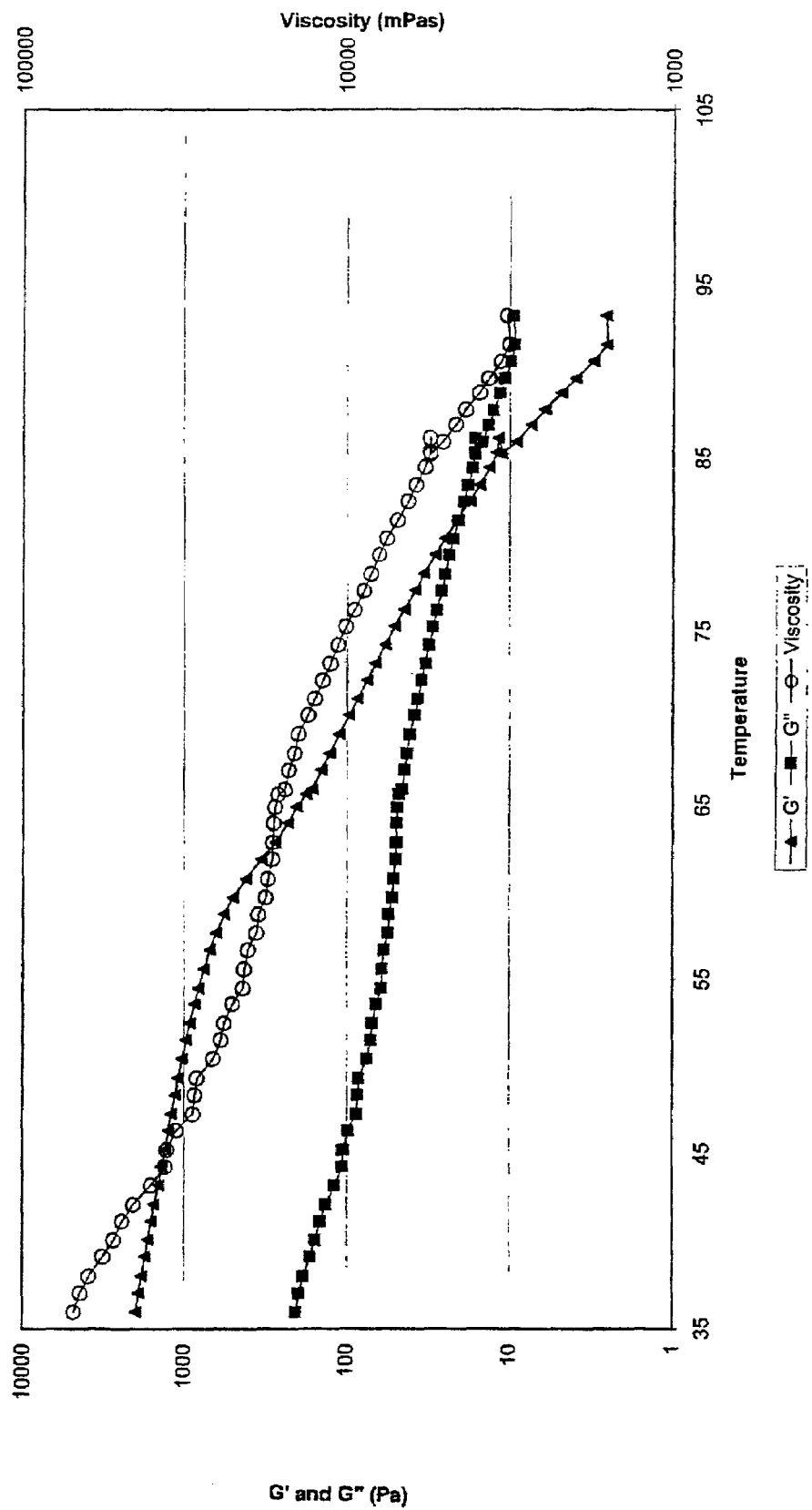
Fig 1.9

FOOD COMPOSITIONS WITH HIGH SOLIDS CONTENT, A METHOD FOR ITS PREPARATION AS WELL AS THE USE OF CARRAGEENANS FOR GELLING A FOOD COMPOSITION

This application is a National Stage filing of PCT/DK00/00252, filed May 12, 2000.

TECHNICAL FIELD

This invention relates to a food composition having high solids content, a method for its preparation as well as the use of carrageenans for gelling a food composition. More particularly, this invention relates to confectionery products such as e.g. soft candies comprising as gelling agent one or more carrageenans, a method for the preparation thereof as well as the use of carrageenans for gelling a food composition.

BACKGROUND ART

Food compositions having high solids content, such as confectionery products, e.g. soft candies or wine gum, are conventionally gelled by the use of gelatine, a heterogenous mixture of water-soluble high molecular weight proteins. Gelatine is derived from collagen, usually by boiling anal hides or bones.

Despite its excellent gelling capability, gelatine suffers from a number of drawbacks which can be attributed to its animal origin. Thus, gelatine is unacceptable to those of Muslim and Jewish faith, as it is often prepared from swine skin. Further, recently the use of gelatine in foods has been questioned due to the possible link between consumption of foods containing gelatine of bovine origin and the occurrence of the Creutzfeldt-Jakob disease. Finally, the consumption of animals and animal-derived foods may be objectionable for some from an ethical point of view.

There is therefore a need for a vegetable alternative to gelatine.

One such alternative is carrageenan. Carrageenans extracted from seaweed are known to be useful as thickening, viscosifying and gelling agents. Carrageenans are polysaccharides consisting of alternating copolymers of β(1→3)-D-galactose and α(1→4)-3,6-anhydro-D-galactose units. Several members of the carrageenan family are known, differing in their amounts of sulfate ester and/or other substituent groups, viz iota carrageenan, kappa carrageenan and lambda carrageenan, of which only iota and kappa carrageenans have gelling properties.

A general formula for carageenan is disclosed by Nijenhuis, K. in Advanced Polymer Science, 130, 203–18, (1997):

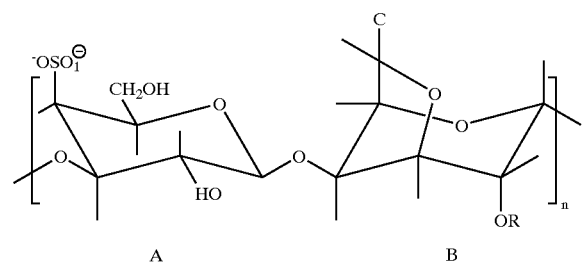

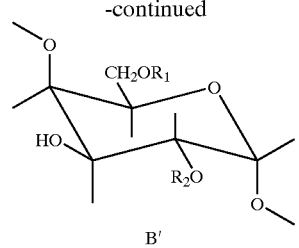

$R = SO_1^\ominus$: i-carrageenan
$R = H$: K-carrageenan

Idealised AB repeating unit of iota and kappa carrageenan polymers based on 1,3-linked β-D-galactose residue (A) and 1,4-linked 3,6-anhydro-α-D-galactose residue (B). The sequence is broken occasionally by residues of the general type B'.

Stortz, C. A. and Cerezo, A. S. describe in Carbohydrate Research, 145 (1986), 219–235, the different members of the carrageenan family by their idealised repeating units:

| Carrageenan | 3-linked residue | 4-linked residue |
| --- | --- | --- |
| Beta | Beta-D-galactopyranose 4-sulfate | 3,6-anhydro-alpha-D-galactopyranose |
| Kappa | Beta-D-galactopyranose 4-sulfate | 3,6-anhydro-alpha-D-galactopyranose |
| Iota | Beta-D-galactopyranose 4-sulfate | 3,6-anhydro-alpha-D-galactopyranose 2-sulfate |
| Mu | Beta-D-galactopyranose 4-sulfate | Alpha-D-galactopyranose 6-sulfate |
| Nu | Beta-D-galactopyranose 4-sulfate | Alpha-D-galactopyranose 2,6-disulfate |
| Lambda | Beta-D-galactopyranose 2-sulfate (70%) and Beta-D-galactopyranose (30%) | Alpha-D-galactopyranose 2,6-disulfate |
| Theta | Beta-D-galactopyranose 2-sulfate | 3,6-anhydro-alpha-D-galactopyranose-2-sulfate |
| Xi | Beta-D-galactopyranose 2-sulfate | Alpha-D-galactopyranose 2-sulfate |

However, it is well-known to anyone skilled in the art that the solubility of carrageenans in systems of high soluble solids content is very limited, see e.g. "Carrageenan" by W. R. Thomas in Thickening and Gelling Agents for Food, Ed. A. Imeson, 1992, from which it appears that iota carrageenan is insoluble at soluble solids contents of 50% and above, whereas kappa carrageenan is only hot soluble at 50% soluble solids (SS) content. Consequently, carrageenans have in the past mainly been used either in lower SS systems or in systems not requiring any gel formation.

U.S. Pat. No. 5,631,034 discloses a method for preparing an aqueous sugar frosting mix comprising from about 70 to about 90% by weight of sugar, from about 9 to about 29% by weight of aqueous liquid and from about 0.05 to about 1.0% by weight of a crystal growth inhibitor. Said crystal growth inhibitor may be a carrageenan. The purpose of the use of carrageenan in this system is to inhibit crystal growth of the sugar and to provide binding properties of the sprayable solution.

U.S. Pat. No. 5,306,519 discloses a syrup composition having a sufficiently low viscosity so that it can be poured or pumped yet upon contact with a calcium containing confection its viscosity increases. Said syrup comprises from about 25 to about 60% sugar solids, water, at least one sequestrant, and an amount of at least one calcium reactive gum sufficient to thicken the syrup upon contact with the calcium containing confection. Said calcium reactive gum may be a carrageenan which may be incorporated into the syrup at a level from about 0.05 to about 0.5%, preferably from about 0.1 to 0.3%.

WO 95/12985 discloses an injectable fondant and method of manufacturing same. Said injectable fondant presents in its cooled state, at least 0,5 day after manufacture, a solids content of 68–75% by weight, including less than 1% by weight of stabiliser. Said stabiliser may be a carrageenan.

U.S. Pat. No. 5,607,716 discloses a low or no fat, water and sugar based high solid confection comprising at least 80% to 90% total solids by weight, wherein the carbohydrate content is at least 70% by weight of the total solids, a cation containing edible material, a cation reactive and thermosensitive hydrocolloid, and up to 7% by weight of fat, said confection having a water activity below 0.65 and a pH from 3.0 to 8.5. The hydrocolloid may be a carrageenan in an amount of from 0.25 to 3.5% by weight.

U.S. Pat. No. 5,132,128 discloses a dessert topping having a pH greater than 4,6 and having a water activity of less than 0,84 and comprising a blend of carrageenan gum, a powdered cellulose bulking agent, a non-heat thinning cellulose gum bulking agent, high fructose corn syrups, an edible humectant and non-fat milk. The carrageenan gum may be used in an amount in the range of 0.75–1.75% by weight of said topping, and the high fructose corn syrup is in the range of 50–60% by weight of said topping. Said blend of carrageenan gum provides both gelling and viscosity control in order to obtain a suitable low viscosity upon heating while providing a viscous texture of the topping when placed on a dessert, particularly ice cream.

EP 0 045 522 A2 discloses edible food containers for use with a food product by applying a barrier coating composition to at least the interior surface thereof. The barrier coating composition comprises a sugar solution having a sugar content of at least 50% by weight and optionally other ingredients % such as a flavour-producing material or a vegetable gum. Said gum material, which may be a carrageenan, may be present in an amount of about 0.1 to 2% by weight. The barrier coating composition forms a film, which through the use of said gum material adheres to the inner surface of the food container.

EP 0 366 248 A2 discloses preservative compositions for fruits and vegetables comprising antidiscolouration agent and edible thixotropic gum. A typical composition may contain 20–60% by weight of edible bulk filler (eg maltodextrin, preferably a low dextrose equivalent maltodextrin), 20–60% ascorbic acid and 1–50% edible thixotropic gum and 1–25% natural or artificial flavouring. Thus, a thixotropic material is provided.

WO 98/20860 discloses a chewable composition for delivery of a pharmacologically active material to a user comprising sweetener, carrageenan and water, said composition comprising from about 50 to about 83% of solids. Carrageenan may be present in an amount from about 2% to 5,5% and optionally one or more of an additional hydrocolloid is present in a total amount of from about 0.5% to about 2%. Any suitable sweetener may be used.

EP 0 273 001 discloses a soft, sugarless, aerated confectionery comprising soluble solids in the form of hydrogenated starch hydrolysates in the range from 35 to 89% by weight and up to 5.5% by weight of hydrocolloid such as a seaweed extract. The disclosed confectionery does not include any sugar and is deposited at temperatures of about 130 to 140° C.

U.S. Pat. No. 5,603,979 discloses a method for the preparation of a fat-free peanutbutter like product comprising 15–40% by weight of water, 0.5–1.5% by weight of natural gum, 5–20% by weight of peanut flour, 20–35% by weight of syrup and 5–13% by weight of humectant. Carrageenan may be used as gum component. The product obtained must be spreadable.

Thus, as can be seen, the prior use of carrageenan has either been in lower soluble solids systems or in non-gelled end-products. Alternatively, the application of high operating temperatures have been required. It has hitherto not been possible to disperse efficiently a carrageenan in a high solids system at a temperature of below 100° C. at atmospheric pressure in order to form a gelled end-product, in which said carrageenan provides the main gel structure and texture.

BRIEF DESCRIPTION OF THE INVENTION

The object of the present invention is thus to provide a gelled food composition having high soluble solids content wherein said composition has an adequate low viscosity during depositing in e.g. moulds, gels rapidly and can successfully be produced at temperatures not requiring special apparatuses or arrangements to be met.

In its first aspect, the present invention relates to a food composition comprising soluble solids in the range of 50% to 90% by weight, at least 70% by weight thereof being a sweetening system comprising sucrose and non-sucrose sweeteners in a weight ratio of sucrose to non-sucrose sweeteners of 0:100 to 95:5, wherein the non-sucrose sweetener is of a DE (Dextrose Equivalent) of at least about 30, a carrageenan component in an amount sufficient to form a gel, and water to balance, wherein the gelation temperature, determined as the intersection of the graphs of elastic modulus, G', and viscous modulus, G", of composition is <95° C. measured on a HAAKE™ Rheometer, RS 100 using the settings—Gradient 1° C./min, 0.4640 Hz, 95° C.–65° C., t=1800 s, 0.50 Pa, 65° C.–35° C., t=1800 s, 2.50 Pa-Stress sweep 5° C. 0.10 Pa–20.00 Pa, 0.4640 Hz.

The elastic modulus, G', indicates the solid behaviour of a gel, and is a measure of the gel strength, while the viscous modulus, G", indicates the liquid behaviour of the gel, which correlates to the degree of bounciness and trembling of the gel.

In a second aspect, the present invention provides a process for producing a food composition as defined above comprising (a) dispersing carrageenan in a syrup of a non sucrose sweeetener at a temperature sufficient to disperse the carrageenan in said syrup while stirring, (b) adding water and heating the mixture to the boiling point thereof, (c) adjusting the soluble solids content to from about 50% to about 90% by weight, (d) depositing said mixture, and (e) cooling said mixture to below the depositing temperature of said mixture.

As used herein, the term "depositing temperature" means the lowest temperature, at which depositing is possible, i.e. at which temperature the food composition is still flowable, such as through a "Mogul" plant or depositor.

In a third aspect, the present invention provides the use of a carrageenan component for gelling a food composition of a soluble solids content of about 50 to about 90% by weight, at least 70% by weight thereof being a sweetening system comprising sucrose and non-sucrose sweeteners in a weight ratio of sucrose to non-sucrose sweeteners of 0:100 to 95:5, wherein the non-sucrose sweetener is of a DE of at least about 30 and wherein the gelation temperature of said composition determined as the intersection of the graphs of elastic modulus, G', and viscous modulus, G", measured on a HAAKE™ Rheometer, RS 100 using the settings—Gradient 1° C./min, 0.4640 Hz, 95° C.–65° C., t=1800 s, 0.50 Pa, 65° C.–35° C., t=1800 s, 2.50 Pa-Stress sweep 35° C. 0.10 Pa–20.00 Pa, 0.4640 Hz, is <95° C.

BRIEF DESCRIPTION OF THE DRAWING

The invention is described in more details with reference to the accompanying drawing, wherein FIGS. 1.1 to 1.9 illustrate viscosity, elastic modulus, G', and viscous modulus G", versus temperature for food compositions produced according to example 8.

Figure 2:
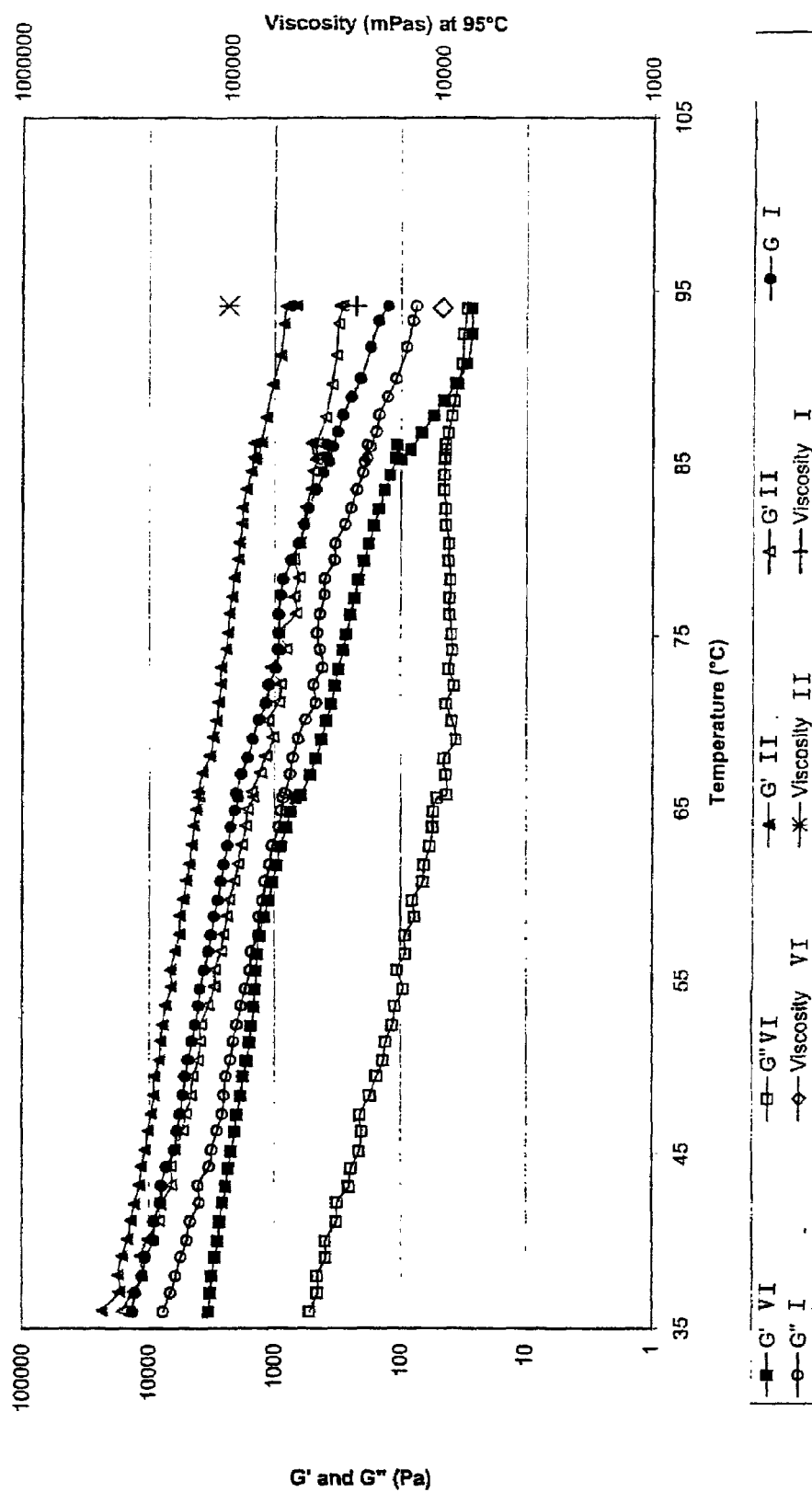
FIG. 2 illustrates viscosity, elastic modulus, G', and viscous modulus, G", versus temperature for food compositions I, II and VI according to Example 9.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BEST MODE FOR CAMMING OUT THE INVENTION

The food composition according to the invention in a preferred embodiment comprises a sweetening system comprising sucrose and non sucrose sweeteners in a weight ratio of sucrose to non sucrose sweetener of 0:100 to 95:5, wherein the non sucrose sweetener is a hydrogenated-starch hydrolysate syrup of a DE of at least about 30, preferably a DE>30 fructose or glucose syrup.

In a particularly preferred embodiment of the present invention, said non sucrose sweetener is a hydrogenated starch hydrolysate syrup with a DE of at least about 40, preferably a DE>40 fructose or glucose syrup.

As used herein, the term "DE" stands for "Dextrose Equivalent". DE indicates the degree to which a carbohydrate starting material has been decomposed to dextrose.

Thus, it has been found that at DE values below about 30, the carrageenan employed will swell excessively, leading to excessive gelling causing a gelation temperature well above 100° C. However, gelation temperatures of above 100° C. are undesirable from a practical point of view, necessitating special precautions and requirements in terms of e.g. apparatus.

By employing the above mentioned sweetening system, it has, however, surprisingly been shown that it is possible to dissolve a carrageenan component in a high solids system of about 50 to about 90% by weight of soluble solids using a minor amount of water. A particular advantage of the present invention is thus the fact that the amount of water added can be limited compared to a conventional process whereby less energy is needed for the subsequent evaporation thereof to obtain a final product of a desired soluble solids content. The present invention thus represents a substantially increased process efficiency.

In a preferred embodiment, the non sucrose sweetener is a hydrogenated starch hydrolysate syrup with a DE in the range of about 40 to about 100, particularly preferred about 50 to 90, especially about 60 to 70. A non sucrose sweetener with a maltose content ≧50% and a DE of about 50 to 60 is particularly preferred. Said embodiment provides the optimum characteristics in terms of sweetness level, texture and solubility of the gelled food composition.

In another embodiment of the present invention, the sucrose can be replaced wholly or partly by an aqueous solution of a sugar alcohol. Said sugar alcohol is preferably, but not exclusively, selected among sorbitol, mannitol, xylitol, isomalt, lactitol, maltitol or a maltitol syrup.

In a preferred embodiment of the present invention, the sweetening system comprises sucrose and non sucrose sweeteners in a weight ratio of sucrose to non sucrose sweetener of from about 10:90 to about 70:30, preferably from about 20:80 to about 30:70, particularly preferred about 1:2. Thus, it has been found that at the disclosed ratios, an acceptable sweetness level still providing a composition having a gelation temperature of <95° C. is obtained.

Particularly preferred, the gelation temperature of said food composition is <85° C., preferably <80° C.

The present invention is highly suitable for preparing gelled food compositions having high soluble solids content. In a preferred embodiment, said soluble solids content is in the range of 70 to 85% by weight, particularly preferred about 75 to 80% by weight.

Advantageously, at least about 80%, preferably at least about 90% of the soluble solids are comprised by the above sweetening system. Thus, it has been shown that even at such high concentrations of sweetening system a gelled product having a satisfactory gelation temperature may be obtained.

As carrageenan component an iota carrageenan or a kappa carrageenan or mixtures thereof are employed, preferably in an amount of about 0.25 to 10.0% by weight, preferably about 0.75 to 5.0%, especially about 1 to 3% by weight of the food composition. Suitable carrageenans are commercially available as e.g. GENUTINE™ type X-8300, X-8302, and X-9303 from Hercules Copenhagen, Denmark, or GENUGEL™ type WR-713 or X-8605, likewise available from Hercules Copenhagen.

While the above carrageenans are the preferred ones, it must be understood that the invention is not limited thereto. Thus, any carrageenan component, which will provide the required gelling capability, may be employed in a food composition according to the present invention. More particularly, a carrageenan component in a non-purified form, such as in the form of seaweed, particularly red seaweeds, may also be employed.

Further, one or more additional hydrocolloids may be employed in combination with the above disclosed carrageenans to provide a particular gelling property, such as pectin, e.g. GENU™ Pectin, available from Hercules Copenhagen, agar—agar, e.g. GENU™ Agar, available from Hercules Copenhagen, cellulose, such as AVICEL™, cellulose extracts and derivatives such as carboxy methyl cellulose (CMC), e.g. Blanose cellulose gum, methyl cellulose, e.g. Benecel™, hydroxy propyl cellulose, e.g. Klucel, hydroxy propyl methyl cellulose and mixtures thereof, starch, such as Avebe™ Perfectagel MPT, Avebe™Perfectagel 928 and Avebe™Perfectamyl Gel MB, alginates, xanthans such as Keltrol or Kelgum from Kelco Biopolymers, curdlan, gelatine, guar, locust bean gum, tara gum, karaya gum, gellan gum such as Kelcogel from Kelco Biopolymers, furcellaran, tragacanth, and gum arabic, generally in an amount of up to about 10% by weight.

As further optional ingredients, conventional additives to obtain a desired, tasty food composition, may be added, such as conventional milk solids, vitamins, minerals, food grade acids and salts thereof, flavourings, colourings, artificial sweeteners, preservatives, bulking agents such as Simpless™ from Kelco Biopolymers, isomaltose, trehalose, tagatose, erythritol and polydextrose.

Suitable food grade acids comprise inter alia citric acid, fumaric acid, acetic acid, adipic acid, malic acid, ascorbic acid, tartaric acid, lactic acid, sorbic acid and mixtures thereof.

As flavourings may be employed any food grade flavourings desired for the particular purpose, such as fruit flavours, e.g. strawberry, raspberry, orange or lemon, vanilla, peppermint, wintergreen, cinnamon, eucalyptus, coffee, tea, liquorice, etc. Further food grade colourings may be added to obtain a desired appearance of the food composition.

Optionally, one or more artificial sweeteners may be employed in order to obtain a particular sweetness level, such as saccharin and salts thereof, cyclamate salts, acesulfame K, aspartame, alitame, neohesperidin DC, sucralose, stevioside, and thaumatin.

As preservatives any approved preservative may be used, such as benzoic acid, sorbic acid and salts and esters thereof.

It has been found that the above disclosed food composition allows obtention of a lowering of the gelation temperature of the food composition in question to less than 95° C. A lowering of the gelation temperature and, consequently, the depositing temperature represents a substantial improvement in the confectionery industry, since less complicated apparatuses and simpler and more cost effective production methods may be employed during manufacture.

The food composition according to the invention is in a preferred embodiment a high sugar confectionery, such as soft candies, also known as wine gums, gummy candies or chews. Thus, it has been shown that the present invention provides a food composition having a unique new texture resembling the chewiness conventionally obtained by means of gelatine as gelling agent.

The food composition in another embodiment of the invention is an aerated confectionery and further comprises a whipping agent. Aerated confectioneries, such as marshmallows, can thus successfully be prepared by the present invention.

Further, the food composition according to the invention can take the form of glazings.

It must be appreciated, however, that the present invention is not limited to the above disclosed specific embodiments. On the contrary, the present invention may be employed to produce a variety of other high sugar confectioneries, such as leathers, angel kisses, chocolate containing candies, fillings, reversible glazings, heat stable glazings, thixotrophic glazings, nappages, lollypops, liqourice products, candy bars, jelly beans and pastils etc.

The present invention also provides a process for producing the food composition according to the invention by (a) dispersing carrageenan in a syrup of a non sucrose sweetener at a temperature sufficient to disperse the carrageenan in said syrup while stirring, (b) adding water and heating the mixture to the boiling point thereof, (c) adjusting the soluble solids content to from about 50% to about 90% by weight, (d) depositing said mixture and (e) cooling said mixture to below the depositing temperature of said mixture. Any sucrose to be employed in order to obtain a desired sweetness level is added after heating the mixture to the boiling point thereof.

The food composition obtained through the above process is preferably deposited in moulds and left to stand for a few minutes up to about one hour. Thus, whereas prior art gelatine gelled confectioneries tend to adhere to moulds of plastics and metal and consequently have to be deposited in starch moulds and necessitates standing for up to a week in order to obtain a final texture, the food composition according to the invention gels instantaneously, can be deposited in any type of mould, such as metal and plastic moulds, and can be demoulded within minutes up to about one hour. The present invention thus allows a faster and more flexible production of gelled food compositions.

Any further ingredients of the food composition, such as food grade acids, flavourings, colourings, artificial sweeteners or preservatives are preferably added after adjustment of the soluble solids content in step (c). In the case of production of aerated confectioneries, a whipping agent is separately mixed with water and any icing or confectioner's sugar and beaten to a stiff foam before addition to the high solids composition.

While the above disclosed process is the preferred one, the present invention is not limited thereto. Thus, the food composition according to the invention may also be produced by a process, whereby carrageenan is dispersed in sucrose, if any, the dry mixture obtained is dissolved in water and heated, non sucrose sweetener and optionally any additional sucrose is added to the hot mixture, whereupon the soluble solids content is adjusted to the desired level. Finally, the product obtained is cooled to below the depositing temperature. The latter process is particularly useful in connection with the preparation of glazings.

Further, the food composition according to the invention may be prepared by dispersing carrageenan in water while heating, adding said dispersion to a hot sweetener solution, whereupon the soluble solids content is adjusted to the desired level and any additional ingredients are added.

The present invention also provides the use of a carrageenan component for gelling a food composition of a soluble solids content of about 50 to about 90% by weight, at least 70% by weight thereof being a sweetening system comprising sucrose and non-sucrose sweeteners in a weight ratio of sucrose to non-sucrose sweeteners of 0:100 to 95:5, wherein the non-sucrose sweetener is of a DE of at least about 30, and wherein the gelation temperature of said composition determined as the intersection of the graphs of elastic modulus, G', and viscous modulus, G", measured on a HAAKE™ Rheometer, RS 100 using the settings—Gradient 1° C./min, 0.4640 Hz, 95° C.–65° C., t=1800 s, 0.50 Pa, 65° C.–35° C., t=1800 s, 2.50 Pa-Stress sweep 35° C. 0.10 Pa–20.00 Pa, 0.4640 Hz, is below 95° C. The carrageenan component is preferably an iota carrageenan or a kappa carrageenan or mixtures thereof.

Thus, a vegetable alternative to gelatine has-been provided giving a product of a similar texture as gelatine gelled products and which allows the preparation of food compositions of high soluble solids content in a cost and energy efficient, industrially applicable process.

EXAMPLES

In the examples given below the following apparatus and chemicals have been used to prepare and test food compositions according to the invention:

Apparatus:
Texture Analyzer, TA-XT2. 5 kg. Software Texture Expert™, manufactured by Stable Micro Systems, England.

Chemicals:
Sucrose, food grade, Danisco A/S, Denmark
Citric acid, monohydrated, MERCK in 50% w/v solution Tri-sodium citrate, 2H$_2$O, MERCK
GENUTINE™ types X-8302, X-8300, and X-9303 carrageenan, Hercules Copenhagen, Denmark
GENUGEL™ types WR-713 and X-8605 carrageenan, Hercules Copenhagen, Denmark
GENU™ type 900-A1 Agar, Hercules Copenhagen, Denmark
Glucose syrup (DE 39 to 42) 80 to 84% SS, IGOS, Denmark
High Iso Fructose FT-1750 (DE 95), Cerestar, Denmark
High Maltose glucose syrup (DE 54), Cargill HM 70, 80% SS, Cargill, The Netherlands
Glucose HMF 70.9, 80% SS, Cargill, The Netherlands
Invert syrup (DE 95)
Glucose syrup FT 01700 (DE 62 64), Cerestar, Denmark
Maltitol syrup Lyasin 80/55, Roquette, Lille Cedex, France
Hyfoama™ DSN whipping agent.

Example 1.1

High Maltose glucose syrup (DE 54) Cargill HM 70, 80% SS, Cargill, The Netherlands.

Preparation of a Gelled Soft Candy (Wine Gums) Containing 60% SS and a Ratio of DE 40 Glucose Syrup:DE 95 Fructose Syrup:Sucrose of 27:13:60.

362.2 g of DE 40 glucose syrup and 207.8 g of DE 95 fructose syrup (components A) are heated to about 60° C. in a sauce pan. 50.0 g of iota carrageenan type X-8300 (component B) is added to the syrup while stirring with a high speed mixer.

Upon complete dispersion of the carrageenan 870.6 g of water and a buffering agent in the form of 20.8 g of tri-sodium citrate (components C) are added to the slurry which is then heated to the boiling point (100° C.) while stirring.

Thereafter 659.6 g of sucrose (component D) is added to the slurry which is then boiled (100° C.) while stirring to adjust the content of soluble solids to 60% by weight by evaporation of water.

To this slurry 40.0 g of 50% w/v citric acid (component E) is added in order to obtain a pH of about 3.8 while stirring to obtain a total of 2 kg of final slurry.

The slurry is then poured into a hot depository funnel and filled into moulds. After depositing for about one hour a soft candy with a firm and chewy texture is obtained. The depositing temperature of the individual samples is noted. The average depositing temperature of slurry 1.1 is presented in table VI together with the texture of the deposited slurries, as well as their pH and content of soluble solids tested according to the measurement methods given below.

Examples 1.2 to 4.4

Table I provides a recipe for preparing the soft candies according to examples 1.2 to 4.4. The amount of each ingredient used in the preparation of these are given in grams per 100 grams of final slurry. The method of preparation is performed analogously to Ex. 1.1.

TABLE I

Ingredients added in the preparation of soft candies (wine gums) according to the examples 1.1 to 4.4

| Component | Ingredients | % SS | Ex. 1.1 (g) | Ex. 1.1 (g) SS | Ex. 1.2 (g) | Ex. 1.2 (g) SS |
|---|---|---|---|---|---|---|
| A | 40 DE syrup | 84 | 18.11 | 15.21 | 21.37 | 17.95 |
|   | 95 DE fructose syrup | 70 | 10.39 | 7.27 | 12.26 | 8.58 |
| B | GENUTINE ™ type X-8300 carrageenan | 100 | 2.50 | 2.5 | 2.50 | 2.5 |
| C | Water 1:1 | 0 | 43.53 | 0 | 32.44 | 0 |
|   | Tri-sodium citrate | 100 | 1.04 | 1.04 | 1.04 | 1.04 |
| D | Sucrose | 100 | 32.98 | 32.98 | 38.93 | 38.93 |
| E | Citric acid 50% w/v | 50 | 2.00 | 1 | 2.00 | 1 |
|   | Evaporation |  | 10.54 |  | 10.54 |  |
|   | Yield |  | 100 |  | 100 |  |
|   | Yield soluble solids |  |  | 60 |  | 70 |

| Component | Ingredients | % SS | Ex. 2.1 (g) | Ex. 2.1 (g) SS | Ex. 2.2 (g) | Ex. 2.2 (g) SS |
|---|---|---|---|---|---|---|
|   | 60 DE glucose syrup | 80 | 55.13 | 44.1 | 65.06 | 52.05 |
| B | GENUTINE ™ type X-8300 carrageenan | 100 | 2.50 | 2.5 | 2.50 | 2.5 |
| C | Water 1:1 | 0 | 38.52 | 0 | 26.53 | 0 |
|   | Tri-sodium citrate | 100 | 1.04 | 1.04 | 1.04 | 1.04 |
| D | Sucrose | 100 | 11.36 | 11.36 | 13.41 | 13.41 |
| E | Citric acid 50% w/v | 50 | 2.00 | 1 | 2.00 | 1 |
|   | Evaporation |  | 10.54 |  | 10.54 |  |
|   | Yield |  | 100 |  | 100 |  |
|   | Yield soluble solids |  |  | 60 |  | 70 |

| Component | Ingredients | % SS | Ex. 3.1 (g) | Ex. 3.1 (g) SS | Ex. 3.2 (g) | Ex. 3.2 (g) SS | Ex. 3.3 (g) | Ex. 3.3 (g) SS |
|---|---|---|---|---|---|---|---|---|
| A | 95 DE fructose syrup | 70 | 63.00 | 44.1 | 74.36 | 52.05 | 85.71 | 60 |
| B | GENUTINE ™ type X-8300 carrageenan | 100 | 2.50 | 2.5 | 2.50 | 2.5 | 2.50 | 2.5 |
| C | Water 1:1 | 0 | 30.64 | 0 | 17.23 | 0 | 3.83 | 0 |
|   | Tri-sodium citrate | 100 | 1.04 | 1.04 | 1.04 | 1.04 | 1.04 | 1.04 |

TABLE I-continued

Ingredients added in the preparation of soft candies (wine gums) according to the examples 1.1 to 4.4

| | | | | | | | | |
|---|---|---|---|---|---|---|---|---|
| D | Sucrose | 100 | 11.36 | 11.36 | 13.41 | 13.41 | 15.46 | 15.46 |
| E | Citric acid 50% w/v | 50 | 2.00 | 1 | 2.00 | 1 | 2.00 | 1 |
| | Evaporation | | 10.54 | | 10.54 | | 10.54 | |
| | Yield | | 100 | | 100 | | 100 | |
| | Yield soluble solids | | | 60 | | 70 | | 80 |

| | | | Ex. 4.1 | | Ex. 4.2 | | Ex. 4.3 | | Ex. 4.4 | |
|---|---|---|---|---|---|---|---|---|---|---|
| Component | Ingredients | % SS | (g) | (g) SS | (g) | (g) SS | (g) | (g) SS | (g) | (g) SS |
| A | 60 DE glucose syrup | 80 | 56.61 | 45.29 | 66.55 | 53.24 | 76.49 | 61.19 | 81.46 | 65.17 |
| B | GENUGEL ™ type WR-713 carrageenan | 100 | 1.00 | 1 | 1.00 | 1 | 1.00 | 1 | 1.00 | 1 |
| C | Water 1:1 | 0 | 38.22 | 0 | 26.23 | 0 | 14.24 | 0 | 8.25 | 0 |
| | Tri-sodium citrate | 100 | 1.04 | 1.04 | 1.04 | 1.04 | 1.04 | 1.04 | 1.04 | 1.04 |
| D | Sucrose | 100 | 11.67 | 11.67 | 13.72 | 13.72 | 15.77 | 15.77 | 16.79 | 16.79 |
| E | Citric acid 50% w/v | 50 | 2.00 | 1 | 2.00 | 1 | 2.00 | 1 | 2.00 | 1 |
| | Evaporation | | 10.54 | | 10.54 | | 10.54 | | 10.54 | |
| | Yield | | 100 | | 100 | | 100 | | 100 | |
| | Yield soluble solids | | | 60 | | 70 | | 80 | | 85 |

Example 6.1

Preparation of an Aerated Food Composition (Marshmallows)

Aerated confectioneries (marshmallows) were produced according to the following table:

TABLE III

| Component | Ingredients | % SS | (g) | (g) SS |
|---|---|---|---|---|
| A | Water | — | 16.00 | — |
| | Sucrose | 100 | 46.00 | 46.00 |
| | Glucose syrup (DE-39) | 84 | 18.00 | 15.12 |
| | Invert syrup | 75 | 19.00 | 14.25 |
| B | Water | — | 13.50 | — |
| | GENUTINE ™ type X-8300 | 100 | 1.12 | 1.12 |
| | GENU ™ Agar type 900-A1 | 100 | 0.45 | 0.45 |
| C | Water | — | 6.50 | — |
| | Icing sugar | 100 | 3.00 | 3.00 |
| | Hyfoama ™ DSN | 100 | 0.40 | 0.40 |
| D | Flavour and colour | | Optional | |
| | Evaporation | | 23.97 | |
| | Yield | | 100.00 | |
| | Yield soluble solids | | | 80.34 |

A sugar syrup is prepared by mixing the components (A) and heating to the boiling point. Separately a dispersion of carrageenan and a further hydrocolloid in the form of GENU™ type 900-A1 agar is dispersed in 90° C. water (Component B) while stirring with a high speed mixer for two minutes. Component (B) is added to component (A) and boiled to 86% of soluble solids. Separately therefrom the ingredients of component (C) are mixed and beaten to a stiff foam.

The mixture of component (A) and (B) is slowly added to component (C) while whipping and beating for about three minutes at high speed.

Thereupon, optional flavour and colour are added, and the slurry is deposited immediately in a hot state in a manner analogous to example 1.1.

Example 7.1

Preparation of a High Sugar Glazing

A high sugar glazing was produced according to the following table.

TABLE IV

| Component | Ingredients | % SS | (g) | (g) SS |
|---|---|---|---|---|
| A | GENUGEL ™ type X-8605 carrageenan | 100 | 0.4 | 0.4 |
| | Sucrose | 100 | 4.0 | 4.0 |
| | Tri-sodium citrate | 100 | 0.6 | 0.6 |
| B | Water | — | 18.0 | — |
| C | Sucrose | 100 | 20.0 | 20.0 |
| D | Glucose syrup** | 80 | 60.0 | 48.0 |
| E | Potassium sorbate 20% w/v | 20 | 0.5 | 0.1 |
| F | Citric acid 50% w/v | 50 | 1.4 | 0.7 |
| | Evaporation | | 4.9 | |
| | Yield | | 100.0 | |
| | Yield soluble solids | | | 74.0 |

**Cerestar FT 01700.

The ingredients of Component (A) are dry-blended and dispersed in component (B) and heated to boiling to dissolve the carrageenan. Component (C) is added while heating, whereupon Component (D) is mixed thereto under continued heating. The heating is continued to obtain a soluble solids content in the range of 73 to 75%, whereupon Component (E) as a preservative and Component (F) as a buffer is added. The composition is deposited as disclosed in example 1.1.

The texture of the above food composition is short, creamy and very transparent. It can be melted without dilution by heating to 60 to 70° C. However, it may also be diluted by about 20% of water to obtain a glazing suitable for fruit and ice cream tarts.

Examples 7.2 to 7.4

Further glazing compositions were produced analogously with the above disclosed procedure. The recipes used appear from the below table V.

TABLE V

| Component | Ingredients | Ex. 7.2 % SS | Ex. 7.2 (g) | Ex. 7.2 (g) SS | Ex. 7.3 % SS | Ex. 7.3 (g) | Ex. 7.3 (g) SS | Ex. 7.4 % SS | Ex. 7.4 (g) | Ex. 7.4 (g) SS |
|---|---|---|---|---|---|---|---|---|---|---|
| A | GENUGEL ™ type X-8605 carrageenan | 100 | 0.4 | 0.4 | 100 | 0.4 | 0.4 | 100 | 0.4 | 0.4 |
|   | Sucrose | 100 | 4.0 | 4.0 | 100 | 4.0 | 4.0 | 100 | 4.0 | 4.0 |
|   | Tri-sodium citrate | 100 | 0.6 | 0.6 | 100 | 0.6 | 0.6 | 100 | 0.6 | 0.6 |
| B | Water | — | 20.0 | — | — | 17.0 | — | — | 15.0 | — |
| C | Sucrose | 10.0 | 17.0 | 17.0 | 100 | 22.0 | 22.0 | 100 | 27.0 | 27.0 |
|   | Glucose syrup* | 80 | 60.0 | 48.0 | 80 | 60.0 | 48.0 | 80 | 60.0 | 48.0 |
| D | Citric acid 50% w/v | 50 | 1.4 | 0.7 | 50 | 1.4 | 0.7 | 50 | 1.4 | 0.7 |
|   | Evaporation |   | 3.4 |   |   | 5.4 |   |   | 8.4 |   |
|   | Yield |   | 100.0 |   |   | 100 |   |   | 100 |   |
|   | Yield soluble solids |   |   | 70.7 |   |   | 75.7 |   |   | 80.7 |

*CERESTAR FT 01700

The texture of the products of ex. 7.2 to 7.4 is pleasantly soft, creamy and short.

Test results of the above compositions appear from the table VII below.

Experimental Results

Measurement Methods:

Texture, pH and content of soluble solids are determined as follows:

Texture

The textures of the deposited samples are characterised by the following parameters: Break strength (BS) (in grams of force), at 5° C., Gel strength (in grams of force), at 5° C. at a 2 mm, 4 mm, and 8 mm compression distance, and Distance to break (DT) at 5° C., which parameters are measured with a Texture Analyzer on test samples deposited in Bloom glasses.

Bloom glasses: Pyrex™ glass cylinders of a diameter of 700 mm and a height of 40 mm, available from Bibby Sterilin Ltd., Stone, Staffordshire, Great Britain.

Break Strength

The Break strength (BS) is determined as the force (in grams) required to compress the sample to break with a 0.5" (1.25 cm) diameter probe.

Gel Strength

The Gel strength is determined as the force (in grams) required to compress the gel 2, 4, and 8 mm, respectively, with a 0.5" (1.25 cm) diameter probe.

Distance to Break

The Distance to break (DT, Distance Travelled) is determined as the distance (in mm) it takes to break the gel.

In these experiments the probe speed is 1 mm/sec.

Refractometer

Part of the gel from one of the Bloom glasses is used for measurement of soluble solids in a refractometer, available from Bellingham & Stanley Ltd., Great Britain, covering the range 40 to 80% SS or 75 to 93% SS.

Depositing Temperature

Said temperature is measured with a thermometer placed in the centre of a depository funnel. The depositing temperature is read as the temperature just before the material is non-flowable.

Gelation Temperature

The gelation temperature, $T_{gel}$, is the temperature at which the gel-forming process initiates. It is determined as the intersection of the graphs of elastic modulus, G', and viscous modulus, G", respectively.

Rheological measurements: Rheological measurements to determine the elastic modulus, G', the viscous modulus, G", as well as the viscosity versus temperature were performed using a Haake Rheometer, RS100, Rheostress, Haake, Germany.

Measurements were performed using the following settings:

Gradient 1° C./min, 0,4640 Hz
  95° C.–65° C., t=1800 s, 0,50 Pa
  65° C.–35° C., t=1800 s, 2,50 Pa
Stress sweep 35° C.
  0,10 Pa–20,00 Pa, 0,4640 Hz Springiness Springiness is a measure of the ability of the sample to regain its original shape after compression. The sample is placed under a cylinder probe, avoiding any irregular or non-representative areas. The probe then compresses the sample until it has compressed 20% of the product height. The probe holds this position for 60 seconds and then withdraws from the sample and returns to its starting position. The force on the probe after 60 seconds at the 20%-position is recorded (F 60). % springiness is calculated from the expression:

$$\% \text{ springiness} = \frac{F\,60}{F_o} \times 100\%$$

wherein $F_o$ is the force measured after 0 seconds.

Test results for examples 1.1 to 4.4 and 7.2 to 7.4 appear from the below Tables VI and VII, respectively.

TABLE VI

Test results for examples 1.1 to 4.4, soft candies (wine gums)

|   | Ex. 1.1 | Ex. 1.2 | Ex. 2.1 | Ex. 2.2 |
|---|---|---|---|---|
| % SS (calculated) | 60 | 70 | 60 | 70 |
| Sucrose:Non sucrose | 60:40 | 60:40 | 20:80 | 20:80 |
| DE of non sucrose | ~DE 60 | ~DE 60 | DE 60 | DE 60 |

TABLE VI-continued

Test results for examples 1.1 to 4.4, soft candies (wine gums)

TA.XT2 measurements in Bloom glasses

| | | | | | |
|---|---|---|---|---|---|
| Gel strength | 2 mm (g) | 6.7 | 6.8 | 6.0 | 6.9 |
| | 4 mm (g) | 15.3 | 16.2 | 14.1 | 16.3 |
| | 8 mm (g) | 40.0 | 41.2 | 37.2 | 41.0 |
| BS (g) | | 739 | 873 | 660 | 830 |
| DT (mm) | | 29.6 | 29.8 | 29.3 | 30.0 |
| Depositing temperature (° C.) | | 74–76 | 84–86 | 76–78 | 84–86 |
| pH | | 3.8 | 3.8 | 3.8 | 3.9 |
| % SS (measured) | | 60.0 | 70.0 | 60.0 | 67.0 |

| | | Ex. 3.1 | Ex. 3.2 | Ex. 3.3 | Ex. 4.1 | Ex. 4.2 | Ex. 4.3 | Ex. 4.4 |
|---|---|---|---|---|---|---|---|---|
| % SS (calculated) | | 60 | 70 | 80 | 60 | 70 | 80 | 85 |
| Sucrose:Non sucrose | | 20:80 | 20:80 | 20:80 | 20:80 | 20:80 | 20:80 | 20:80 |
| DE of non sucrose | | DE 95 | DE 95 | DE 95 | DE 60 | DE 60 | DE 60 | DE 60 |
| TA.XT2 measurements in Bloom glasses | | | | | | | | |
| Gel strength | 2 mm (g) | 9.3 | 8.1 | 8.8 | 298 | 347 | 194 | 118 |
| | 4 mm (g) | 18.8 | 17.6 | 19.2 | 623 | 706 | 546 | 379 |
| | 8 mm (g) | 44.1 | 42.8 | 45.2 | 254 | 395 | 1335 | 1234 |
| BS (g) | | 453 | 555 | 714 | 417 | 534 | 1403 | 2140 |
| DT (mm) | | 26.4 | 27.1 | 30.0 | 27.4 | 29.2 | 9.1 | 14.1 |
| Depositing temperature (° C.) | | 67–69 | 74–76 | 86–88 | 53 | 63 | 86 | 76 |
| pH | | 3.8 | 3.8 | 3.7 | 3.9 | 4.0 | 4.0 | 4.0 |
| % SS (measured) | | 57.0 | 68.0 | 79.0 | 65.0 | 68.0 | 79.0 | 83.0 |

TABLE VII

Test results for examples 7.2 to 7.4, glazings

| | | Ex. 7.2 | Ex. 7.3 | Ex. 7.4 |
|---|---|---|---|---|
| % SS | | 70.7 | 75.7 | 80.7 |
| Sucrose:Non sucrose | | 30:70 | 35:65 | 40:60 |
| DE of non sucrose | | 62 | 62 | 62 |
| TA.XT2 measurements in Bloom glasses | | | | |
| Gel strength | 2 mm (g) | 93 | 93 | 35 |
| | 4 mm (g) | 185 | 238 | 112 |
| | 8 mm (g) | 181 | 239 | 333 |
| BS (g) | | 274 | 347 | 444 |

Example 8

Further test results were obtained, in which gelled soft candies (wine gums) were prepared essentially as described in the above examples 1.1. to 4.4, using GENUTINE™ X-9303 carrageenan at a fixed amount of 2.5%, but varying the weight ratios of sucrose and non-sucrose sweeteners, the DE values of the non sucrose sweetener, and the % SS values.

The characteristics of the different preparations were then determined, and the test results are listed in Table VIII below. Also, the corresponding data (G', G", and viscosity) are shown in FIGS. 1.1 to 1.9.

Viscosity (mPa·s), elastic modulus G' (Pa), and viscous modulus G" (Pa) were plotted as a function of the temperature in FIGS. 1.1–1.9. The data were obtained, using a Haake rheometer.

The gelation temperature of each composition is read from each of the FIGS. 1.1 to 1.9 as the temperature at which the respective G' curve and the G" curve intersects.

All the compositions tested resulted in gelation temperatures below 95° C., water activities above 0.65 and springiness values above 30 (Table VIII).

TABLE VIII

| Ex. No | Use level | Carrageenan | Gelaton temp. (° C.) | Deposit temp. | Viscosity at 95° C. | Syrup/ sugar | Syrup type | DE | Soluble solids | Aw | Springiness % |
|---|---|---|---|---|---|---|---|---|---|---|---|
| 8.1 | 2.5 | GENUTINE ™ X-9303 | 81.1 | 75 | 2788 | 4:1 | HM 70 | DE 54 | 79 (81) | 0.705 | 48.1 |
| 8.2 | 2.5 | GENUTINE ™ X-9303 | 71.3 | 71 | 1455 | 2:1 | HM 70 | DE 54 | 76 | | 49.4 |
| 8.3 | 2.5 | GENUTINE ™ X-9303 | 80.0 | 76 | 3293 | 2:1 | Igos | DE 40 | 76 | | 44 |
| 8.4 | 2.5 | GENUTINE ™ X-9303 | 74.2 | 70 | 974 | 2:1 | Igos | DE 40 | 74 | | |
| 8.5 | 2.5 | GENUTINE ™ X-9303 | 73.5 | 71 | 796 | 2:1 | HM 70 | DE 54 | 73 | | |
| 8.6 | 2.5 | GENUTINE ™ X-9303 | 89.7 | 87 | 9699 | 4:1 | Igos | DE 40 | 79.5 | 0.711 | 38.7 |
| 8.7 | 2.5 | GENUTINE ™ X-9303 | 78.3 | 80 | 2019 | 4:1 | HM 70 | DE 54 | 76 | 0.724 | 41.2 |

TABLE VIII-continued

| Ex. No | Use level | Carrageenan | Gelaton temp. (° C.) | Deposit temp. | Viscosity at 95° C. | Syrup/sugar | Syrup type | DE | Soluble solids | Aw | Springiness % |
|---|---|---|---|---|---|---|---|---|---|---|---|
| 8.8 | 2.5 | GENUTINE ™ X-9303 | 85.5 | 81 | 3862 | 5:95 | HM 70 | DE 54 | 78.5 | 0.673 | 31.1 |
| 8.9 | 2.5 | GENUTINE ™ X-9303 | 81.4 | 77 | 3212 | 100:0 | HM 70 | DE 54 | 79 | 0.718 | 52.6 | it appears, all formulations tested gave satisfactory results in terms of gelation temperatures well below 95° C., and a springiness in the order 40–50%.

Example 9

U.S. Pat. No. 5,607,716 discloses a low fat confectionery gelled by the use of carrageenan. The confectionery according to U.S. Pat. No. 5,607,716, however, does not possess the desired characteristics according to the present invention in terms of gelation temperature, ease of handling, and springiness.

In order to further verify this, tests were performed comparing compositions prepared according to the recipes of examples 6 and 8 of the U.S. Pat. No. 5,607,716 patent.

The type of carrageenan used in this comparative test was GENUTINE™ X-9303 and the results are shown in table X and FIG. 2 below, wherefrom the gelation temperature (intersection point of the G' and G" curves) is obtained.

The compositions were:
I. Composition prepared according to example 6 of U.S. Pat. No. 5,607,716, however using 0.2% GENUTINE™ X-9303, and 87% SS.
II. Composition prepared according to example 8 of U.S. Pat. No. 5,607,716, however using 0.6% GENUTINE™ X-9303, and 89% SS.
III. Composition prepared according to example 6 of U.S. Pat. No. 5,607,716, increasing the amount of GENUINE X-9303 to 2.5%, the amount presently preferred according to the present invention, and reducing the SS content to 75%.
IV. Composition prepared according to example 8 of U.S. Pat. No. 5,607,716, increasing the amount of GENUTINE™ X-9303 to 2.5% and reducing the SS content to 75%.
V. Composition prepared according to the present invention containing 2.5% GENUTINE™ X-9303, 79% SS, a sucrose:non sucrose ratio of 1:4, and a DE 54 of the non-sucrose sweetener.
VI. Composition prepared as in V with 5% evaporated skim milk added.

For details on the composition, see Table IX below. The results obtained are given in Table X.

TABLE IX

| Ingredients/Sample | I | II | III | V | VI |
|---|---|---|---|---|---|
| Evaporated Skim Milk | 36.55 | 34.86 | 31.71 | | 6.39 |
| Di-sodium phosphate | 0.06 | 0.01 | 0.06 | | |
| Tri-sodium citrate | | | | 0.46 | 0.46 |
| High Fructose syrup, 55% fructose | 61.04 | 58.24 | 52.98 | | |
| High Maltose syrup, Cargill HM70 | | | | 68.81 | 63.25 |
| Sugar | | | | 13.76 | 13.80 |
| Butter | | 4.00 | | | |
| Butter flavour | 0.15 | | 0.15 | | |
| AVICEL GP 3252 | 1.00 | 1.00 | 1.00 | | |
| Water | | 0.30 | 10.60 | 13.76 | 13.80 |
| GENUTINE ™ X-9303 | 0.20 | 0.60 | 2.50 | 2.29 | 2.30 |
| NaCl | 0.50 | 0.50 | 0.50 | | |
| Lecithin | 0.20 | 0.19 | 0.20 | | |
| K-2000 (mono- and diglycerides) | 0.30 | 0.30 | 0.30 | | |
| Citric acid (50% w/v solution) | | | | 0.92 | |
| Total | 100.00 | 100.00 | 100.00 | 100.00 | 100.00 |

TABLE X

| Composition | Appearance | Deposition-able | Gelation temp. (° C.) | Viscosity at 95° C. | Springiness |
|---|---|---|---|---|---|
| I | Thick, uneven | Yes | >95 | ~20.000 | <10 |
| II | Very thick, uneven | No | >95 | ~100.000 | <15 |
| III | Thick, very uneven, inhomogeneous | No | >95 | >100.000 | 28 |
| *IV | — | — | — | — | — |
| V | Thin, even, homogeneous | Yes | 81 | ~2.800 | 48 |
| VI | Even, homogeneous | Yes | 90 | ~10.000 | 35 |

*This composition was not possible to make.

This test shows (Table X) that the recipe given in Examples 6 and 8 of U.S. Pat. No. 5,607,716 will not result in a composition with the desired gelation temperature below 95° C., neither if the carrageenan is used in 0.2 to 0.6% amounts (see I and II), nor if the amount is increased to 2.5% (see III and IV). Only the sweetening system used according to this invention (see V and VI) will result in a product with the desired characteristics.

It is evident from the above results that the composition according to the invention (V) has the desired gelation temperature below 95° C., is easier to work with and has more springy characteristics.

The above description of the invention reveals that it is obvious that it can be varied in many ways. Such variations are not to be considered a deviation from the scope of the invention, and all such modifications which are obvious to persons skilled in the art are also to be considered comprised by the scope of the succeding claims.

What is claimed is:

1. A food composition comprising soluble solids in the range of about 50% to about 90% by weight, at least 70% by weight thereof being a sweetening system comprising sucrose and non-sucrose sweeteners in a weight ratio of sucrose to non-sucrose sweeteners of 0:100 to 95:5, wherein the non-sucrose sweetener is of a DE (Dextrose Equivalent) of at least about 30, a carrageenan component in an amount sufficient to form a gel, and water to balance, and wherein the gelation temperature, determined as the intersection of the graphs of elastic modulus, G', and viscous modulus, G", measured on a HAAKE™ Rheometer, RS 100 using the settings—Gradient 1° C./min, 0.4640 Hz, 95° C.–65° C., t=1800 s, 0.50 Pa, 65° C.–35° C., t=1800 s, 2.50 Pa, of said food composition is <95° C.

2. The composition according to claim 1, wherein said non-sucrose sweetener is a hydrogenated starch hydrolysate syrup of a DE of at least about 30.

3. The composition according to claim 1, wherein said non-sucrose sweetener is a hydrogenated starch hydrolysate syrup of a DE of least about 40.

4. The composition according to claim 1, wherein said non-sucrose sweetener is a hydrogenated starch hydrolysate syrup with a DE in the range of—about 40 to about 100.

5. The composition according to claim 4, wherein said non-sucrose sweetener is a high maltose glucose syrup.

6. The composition according to claim 1, wherein the sucrose can be replaced wholly or partly by an aqueous solution of a sugar alcohol.

7. The composition according to claim 6, wherein said sugar alcohol comprises sorbitol, mannitol, xylitol, isomalt, lactitol, maltitol or a maltitol syrup.

8. The composition according to claim 1, wherein the ratio of sucrose to non-sucrose sweetener is from about 10:90 to about 70:30.

9. The composition according to claim 1, wherein the soluble solids thereof is in the range of 70 to 85% by weight.

10. The composition according to claim 1, wherein the gelation temperature of said food composition is less than 85° C.

11. The composition according to claim 1, wherein at least about 80% of the soluble solids are comprised by said sweetening system.

12. The composition according to claim 1, wherein said carrageenan component is an iota carrageenan or a kappa carrageenan or mixtures thereof.

13. The composition according to claim 12, wherein said carrageenan is present in an amount of about 0.25 to 10.0% by weight of the food composition.

14. The composition according to claim 1 further comprising as additional gelling agent a hydrocolloid comprising pectin, agar—agar, alginates, carboxy methyl cellulose, methyl cellulose, hydroxy propyl cellulose, curdlan, xanthans, gelatine, starch or gum arabic in an amount of up to about 10.0% by weight of the food composition.

15. The composition according to claim 1, wherein said soluble solids further comprise at least one of milk solids, vitamins, minerals, food grade acids and salts thereof, flavourings, colourings, artificial sweeteners, preservatives and bulking agents.

16. The composition according to claim 1, wherein said food composition is a high sugar confectionery.

17. The composition according to claim 16, wherein said food composition is soft candies or wine gum.

18. The composition according to claim 1, wherein said composition is an aerated confectionery and further comprises a whipping agent.

19. The composition according to claim 1, wherein said composition is a glazing.

20. A process for producing a food composition according to claim 1 comprising (a) dispersing carrageenan in a syrup of a non-sucrose sweetener at a temperature sufficient to disperse the carrageenan in said syrup while stirring, (b) adding water and heating the mixture to the boiling point thereof, (c) adjusting the soluble solids content to from about 50% to about 90% by weight, (d) depositing said mixture and (e) cooling said mixture to below the depositing temperature of said mixture.

21. The process according to claim 20, wherein sucrose, if any, is added in step (c).

22. The process according to claim 20, wherein the temperature sufficient to disperse the carrageenan in the syrup of the non-sucrose sweetener is at least about 50.

23. The process of according to claim 20, wherein comprising adding at least one of milk solids, vitamins, minerals, food grade acids, flavourings, colourings, artificial sweeteners, preservatives and bulking agents between steps (c) and (d).

24. The process according to claim 20, wherein in step (d) said hot mixture is deposited in moulds.

25. A process for gelling a food composition, said process comprising including a carrageenan component in a food composition composed of a soluble solids content of about 50 to about 90% by weight, at least 70% by weight thereof being a sweetening system comprising sucrose and non-sucrose sweeteners in a weight ratio of sucrose to non-sucrose sweeteners of 0:100 to 95:5, wherein the non-sucrose sweetener is of a DE of at least about 30, and wherein the gelation temperature of said food composition, determined as the intersection of the graphs of elastic modulus, G', and viscous modulus, G", measured on a HAAKE™ Rheometer, RS 100 using the settings—Gradient 1° C./min, 0.4640 Hz, 95° C.–65° C., t=1800 s, 0.50 Pa, 65° C.–35° C., t=1800 s, 2.50 Pa is <95° C.

26. The process according to claim 25, wherein said carrageenan is an iota carrageenan or a kappa carrageenan or mixtures thereof.

27. The composition according to claim 2, wherein said non-sucrose sweetener is a fructose or glucose syrup having a DE>30.

28. The composition according to claim 3, wherein said non-sucrose sweetener is a fructose or glucose syrup having a DE>40.

29. The composition according to claim 4, wherein said non-sucrose sweetener is a hydrogenated starch hydrolysate syrup with a DE in the range of about 50 to 90.

30. The composition according to claim 4, wherein said non-sucrose sweetener is a hydrogenated starch hydrolysate syrup with a DE in the range of about 60 to 70.

31. The composition according to claim 5, wherein said non-sucrose sweetener is a high maltose glucose syrup of a DE of about 50 to 60.

32. The composition according to claim 8, wherein the ratio of sucrose to non-sucrose sweetener is from about 20:80 to about 30:70.

33. The composition according to claim 8, wherein the ratio of sucrose to non-sucrose sweetener is from about 20:80 to about 30:70.

34. The composition according to claim 8, wherein the ratio of sucrose to non-sucrose sweetener is from about 1:2.

35. The composition according to claim 9, wherein the soluble solids thereof is in the range of about 75 to 80% by weight.

36. The composition according to claim 10, wherein the gelation temperature of said food composition is less than 80° C.

37. The composition according to claim 11, wherein at least about 90% of the soluble solids are comprised by said sweetening system.

38. The composition according to claim 13, wherein said carrageenan is present in an amount of about 0.75 to 5.0% by weight of the food composition.

39. The composition according to claim 38, wherein said carrageenan is present in an amount of about 1 to 3% by weight of the food composition.

* * * * *